(12) United States Patent
Tang et al.

(10) Patent No.: US 7,416,799 B2
(45) Date of Patent: Aug. 26, 2008

(54) OXIDIZER FOR A FUEL CELL SYSTEM

(75) Inventors: Ching-Jen Tang, Watervliet, NY (US); Alan S. Feitelberg, Niskayuna, NY (US)

(73) Assignee: Plug Power Inc., Latham, NY (US)

( * ) Notice: Subject to any disclaimer, the term of this patent is extended or adjusted under 35 U.S.C. 154(b) by 372 days.

(21) Appl. No.: 11/022,330

(22) Filed: Dec. 23, 2004

(65) Prior Publication Data

US 2006/0141311 A1 Jun. 29, 2006

(51) Int. Cl.
H01M 8/04 (2006.01)
(52) U.S. Cl. .............................. 429/17; 429/19; 429/34
(58) Field of Classification Search .................. 429/34, 429/13, 17, 19; 60/800, 217, 240; 431/10
See application file for complete search history.

(56) References Cited

U.S. PATENT DOCUMENTS 6,232,005 B1 * 5/2001 Pettit ........................... 429/19

2004/0005491 A1 * 1/2004 Blanchet et al. ............... 429/34
2006/0134568 A1 * 6/2006 Sun et al. ....................... 431/7

* cited by examiner

Primary Examiner—Patrick Ryan
Assistant Examiner—Ban Lewis
(74) Attorney, Agent, or Firm—Pruner & Hu, P.C.

(57) ABSTRACT

An oxidizer that is usable with a fuel cell includes a catalyst, an inlet to communicate an oxidant flow, an injection tube to communicate an anode exhaust flow, a mixing tube and a divergent nozzle. The injection tube communicates the anode exhaust flow from the fuel cell into the oxidizer to produce a combined flow in which the anode exhaust flow is oriented in substantially the same direction as the oxidant flow and surrounded by the oxidant flow. The mixing tube is connected to the inlet to receive the combined flow and mix the oxidant flow and the anode exhaust flow mix together to produce a mixed flow. A cross-sectional flow area of the mixing tube is sized to prevent flashback. The divergent nozzle communicates the mixed flow to the catalyst.

19 Claims, 3 Drawing Sheets

OXIDIZER FOR A FUEL CELL SYSTEM

BACKGROUND

The invention generally relates to an oxidizer for a fuel cell system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

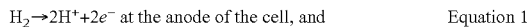

$H_2 \rightarrow 2H^+ + 2e^-$ at the anode of the cell, and      Equation 1

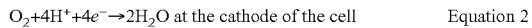

$O_2 + 4H^+ + 4e^- \rightarrow 2H_2O$ at the cathode of the cell      Equation 2

The anode and cathode of a typical PEM fuel cell are formed by locating a catalyst in close physical contact with each side of the PEM. An electrically conductive gas diffusion layer (GDL) is often situated on top of each anode and cathode to improve gas distribution and contact with the anode and cathode catalysts. This combined package of PEM, anode catalyst, cathode catalyst, and GDL is often referred to as a membrane electrode assembly (MEA).

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several MEAs (each one being associated with a particular fuel cell) may be dispersed throughout the stack of flow plates which form the fuel cell stack. Reactant gases from each side of the MEA may leave the flow channels and diffuse through the GDLs to reach the PEM.

The fuel cell stack is one out of many components of a typical fuel cell system, as the fuel cell system includes various other components and subsystems, such as a cooling subsystem, a cell voltage monitoring subsystem, a control subsystem, a power conditioning subsystem, etc. The particular design of each of these subsystems is a function of the application that the fuel cell system serves. Many fuel cell systems include a reformer which reacts hydrocarbon fuel, steam, and often air to form a hydrogen rich gas stream, called reformate, which is the fuel used by the fuel cell stack. Reformate often contains small concentrations of hydrocarbons that passed through the reformer without reacting.

The fuel cell stack produces anode exhaust gas (or "anode tail gas"), a gas that may contain hydrogen that was not consumed in the electrochemical reactions inside the fuel cell stack. The anode exhaust may also contain unreacted hydrocarbons from the reformer. Anode tail gas may be routed to a device, such as an oxidizer, that removes the hydrogen and other hydrocarbons from the flow before venting this flow to the atmosphere. More specifically, the oxidizer reacts any residual hydrogen and/or hydrocarbon fuel that is present in the anode exhaust gas with an oxidant for purposes of removing the hydrogen and/or hydrocarbon fuel and for purposes of recovering thermal energy. Recovering all the thermal energy and minimizing the release of harmful compounds into the atmosphere requires complete, or nearly complete, oxidation of the hydrogen and any hydrocarbons present in the anode tail gas. The reactions between the hydrogen and the oxidant and the hydrocarbon fuel and the oxidant may require a relatively high temperature (a temperature above 600° C., for example).

The anode tail gas produced by some fuel cell systems has a heating value which is too low to support a conventional flame. For this reason, some fuel cell systems use a catalytic anode tail gas oxidizer to promote the oxidation of hydrogen and hydrocarbon fuel at lower temperatures than found in a flame. Catalytic tail gas oxidation typically requires premixing of the anode tail gas and the oxidant to achieve complete oxidation of the hydrogen and the hydrocarbon fuel. Some fuel cell systems also produce anode tail gas with a time-varying composition, due to changes in operating conditions and electrical load on the fuel cell system. Variations in the anode tail gas composition can result in the premixed anode tail gas and oxidant mixture sometimes falling within the flammable regime.

Hydrogen has a relatively high flame speed, which means that when the hydrogen is reacted with an oxidant, and the mixture falls within the flammable regime, the reaction front may easily travel upstream to produce flashback. A device called a flame arrestor may be used with an oxidizer in an attempt to prevent the flashback. However, the use of the flame arrestor typically increases the cost, pressure drop, and complexity of the fuel cell system. In addition, flame arrestors cannot prevent autoignition of a flammable, premixed fuel and oxidant mixture.

Thus, there is a continuing need for a premixed, catalytic oxidizer that achieves complete combustion of the fuel and prevents flashback.

SUMMARY

In an embodiment of the invention, an oxidizer that is usable with a fuel cell includes a catalyst, an inlet to communicate an oxidant flow, an injection tube to communicate an anode exhaust flow, a mixing tube and a divergent nozzle. The injection tube communicates the anode exhaust flow from the fuel cell into the oxidizer to produce a combined flow in which the anode exhaust flow is oriented in substantially the same direction as the oxidant flow and surrounded by the oxidant flow. The mixing tube is connected to the inlet to receive the combined flow and mix the oxidant flow and the anode exhaust flow mix together to produce a mixed flow. A cross-sectional flow area of the mixing tube is sized to prevent flashback. The divergent nozzle communicates the mixed flow to the catalyst.

Advantages and other features of the invention will become apparent from the following drawing, description and claims.

DETAILED DESCRIPTION

Figure 1:
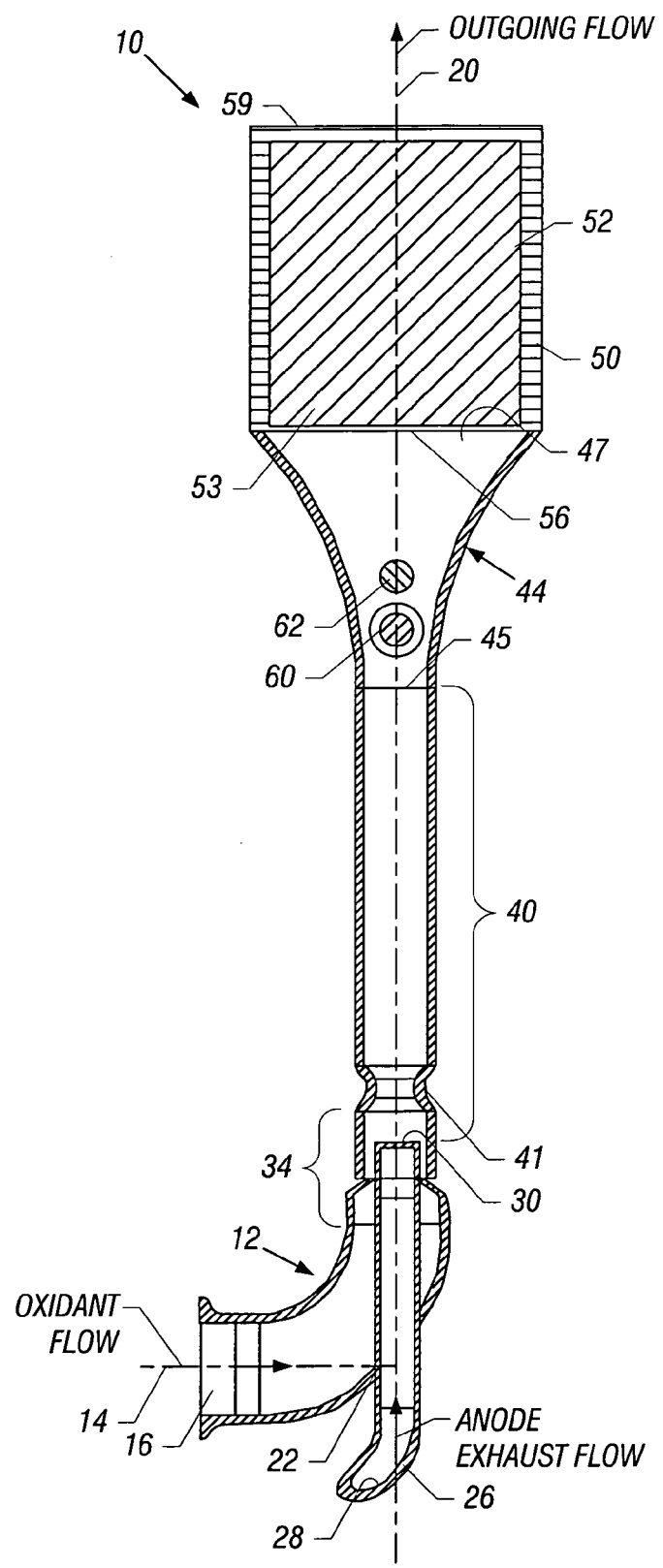
FIG. 1 is a cross-sectional view of an oxidizer according to an embodiment of the invention.

Referring to FIG. 1, an embodiment of a premixer catalytic oxidizer 10 in accordance with the invention may be used in a fuel cell system for purposes of removing residual hydrogen and/or unburned hydrocarbons and recovering thermal energy from an anode exhaust flow. As described below, the oxidizer 10 has features that prevent flashback while premixing the fuel and oxidant, thus achieving complete combustion.

The oxidizer 10 includes an oxidant inlet 12 that receives an incoming oxidant flow at an opening 16 of the inlet 12. The oxidant flow may be provided by a cathode exhaust flow from a fuel cell stack, an air blower, etc., depending on the particular embodiment of the invention. The oxidizer 10 reacts oxidant in the oxidant flow (that is received through the oxidant inlet 12) with hydrogen and hydrocarbon fuel that is present in an exhaust flow (herein called the "anode exhaust flow") from the anode chamber of a fuel cell stack. It is noted that alternatively, in other embodiments of the invention, the flow that is reacted with the oxidant flow may be a flow other than an anode exhaust flow. However, regardless of the source of the hydrogen-containing flow, the flow contains at least some hydrogen that reacts with oxidant inside the oxidizer 10, as further described below. The oxidation reactions occur over the oxidation catalyst 53.

As depicted in FIG. 1, in some embodiments of the invention, the oxidant inlet 12 is a tubular member that has a general ninety degree "elbow" shape. The opening 16, which receives the oxidant flow, is coaxial with an axis 14; and a distal portion 34 of the oxidant inlet 12, which furnishes the oxidant flow to another part (described below) of the oxidizer 10, is oriented so that the portion 34 is coaxial with an axis 20 that is orthogonal to the axis 14. It is noted that the arrangement that is depicted in FIG. 1 is one out of many possible embodiments of the invention. Therefore, in some embodiments of the invention, for example, the oxidant inlet 12 may be generally entirely coaxial with the axis 20. Thus, many variations are possible and are within the scope of the appended claims.

In some embodiments of the invention, the anode exhaust flow is communicated into the oxidizer 10 via an injection tube 26. As depicted in FIG. 1, the injection tube 26 is generally coaxial with the axis 20 and includes an opening 28 that receives the incoming anode exhaust flow. The opening 28 is located outside of the oxidant inlet 12. However, the injection tube 26 extends through an opening 22 of the oxidant inlet 12 and into the central passageway of the inlet 12. More specifically, in some embodiments of the invention, the opening 22 is located in the curved portion of the elbow-shaped oxidant inlet 12 so that at least a portion of the injection tube 26 is coaxial with and is circumscribed by the portion 34 of the oxidant inlet 12.

In some embodiments of the invention, the injection tube 26 extends approximately two inches or more into the central passageway of the oxidant inlet 12. The distance in which the injection tube 26 extends into the oxidant inlet 12 may be more or less than two inches, depending on the particular embodiment of the invention.

Due to the above-described relationship between the oxidant inlet 12 and the injection tube 26, an annular flow of oxidant is generally created around the segment of the injection tube 26 that extends into the central passageway of the oxidant inlet 12. This annular flow of oxidant, in turn, is generally parallel with the longitudinal axis 20. Furthermore, the annular flow of oxidant is directed toward and continues past the outlet 30 of the injection tube 26. The anode exhaust flow travels through the injection tube 26 and exits the tube 26 at the outlet 30.

Due to the annular flow caused by the relationship of the injection tube 26 and the oxidant inlet 12, the anode exhaust flow that exits the injection tube 26 is surrounded by and generally flows in the same direction as the oxidant flow. Thus, at the point where the anode exhaust flow is injected into the oxidizer 10, the anode exhaust flow is surrounded by the oxidant flow.

Referring back to FIG. 1, the combined flow, containing the axial anode exhaust flow and the annular oxidant flow, enters a mixing tube 40 of the oxidizer 10. As depicted in FIG. 1, the mixing tube 40 is coaxial with the axis 20, and the proximate end of the mixing tube 40 is connected to the oxidant inlet 12 to receive the combined flow (i.e., the axial anode exhaust flow and the annular oxidant flow) from the inlet 12. The diameter of the mixing tube 40 is sized so that the flow velocity of the combined flow through the mixing tube 40 is fast enough to prevent a flame from traveling back to the injection tube 26. The mixing tube 40 includes a venturi 41 near its proximate end to further increase the local gas velocity and prevent a flame from propagating upstream to the fuel injection point 30. The mixing tube 40, combined with diverging nozzle 44, has a length that is sufficient to ensure that homogeneous mixing is reached at the distal end of the diverging nozzle 44.

The gas mixture flows from the mixing tube 40 into the central passageway of a divergent nozzle 44, which reduces the gas mixture velocity after the flow exits the mixing tube 40. As depicted in FIG. 1, the divergent nozzle 44 is coaxial with the axis 20 and has a cross-sectional flowpath that increases from an inlet 45 of the nozzle 44 to an outlet 47 of the nozzle 44. After passing through the divergent nozzle 44, the mixed flow enters a reactant chamber 50 (of the oxidizer 10), a chamber in which any residual hydrogen and hydrocarbon fuel (carried into the oxidizer 10 by the anode exhaust flow) reacts with the oxidant. The clean outgoing flow exits the oxidizer 10 through an outlet 59 of the reactant chamber 50.

As depicted in FIG. 1, in some embodiments of the invention, the reactant chamber 50 may be generally circularly cylindrical and coaxial with the axis 20. The reactant chamber 50 includes a catalytic monolith 53, which is a "honeycomb-like" structure that promotes reaction between the hydrogen (and hydrocarbon fuel) and oxidant. Alternatively, as will be apparent to one skilled in the art, the catalyst monolith 53 can be replaced with pellets of a catalytic material. Precious metals such as platinum, palladium, and rhodium are commonly used to catalyze oxidation reactions of the type described here. In some embodiments of the invention, a sealing material 52 (an expandable paper, as one of many possible examples) forms a flexible seal between the catalyst monolith 53 and the wall of the reaction chamber 50.

Due to the presence of the catalyst in the reaction chamber 50, low temperature reactions of the hydrogen (and hydrocarbon fuel) with the oxidant occur. In the absence of such a catalyst, a much higher temperature (1000° C.) is needed in order for the hydrogen (and hydrocarbon fuel) and oxidant reactions to occur. However, with the catalyst, the adiabatic flame temperature of the gas is kept under 650° C. by maintaining the appropriate equivalence ratio (i.e., the oxidant-to-fuel ratio). This low temperature does not damage the catalyst or the wall of the reaction chamber 50. Thus, the catalyst or reactor wall should not experience unacceptable high temperature that may damage parts or create control issues.

Among the other features of the oxidizer 10, in some embodiments of the invention, the oxidizer 10 may include one or more heating elements, such as a glow plugs 60 and 62, that are located in the divergent nozzle 44 for purposes of preheating the mixed flow before the flow enters the reaction chamber 50. The glow plugs 60 and 62 may be electrically controlled when preheating is desired and may be mechanically connected to the divergent nozzle 44 via a boss. In some embodiments of the invention, the glow plugs 60 and 62 may be used only for ignition purposes and turn off once the flow is ignited.

As depicted in FIG. 1, in some embodiments of the invention, the walls of the oxidizer 10 may be formed from two pieces of metal: a first piece of metal that is continuously formed into a tubular member that includes the oxidant inlet 12, mixing tube 40, divergent nozzle 44 and reactant chamber 50; and a second piece of metal that is formed into the injection tube 26. However, in other embodiments of the invention, the walls of the oxidizer may be formed from a single piece of metal or from multiple pieces of metal. For the embodiment of the invention depicted in FIG. 1, a seal (not shown), such as a weld seam, may circumscribe the injection tube 26 where the injection tube 26 enters the oxidant inlet 12.

Thus, to summarize, among the potential advantages of the oxidizer 10, the oxidizer 10 eliminates the need for a traditional flame arrestor and therefore, reduces the cost and complexity of the fuel cell system. The oxidizer 10 also prevents any potential damage caused by flashback. The oxidizer 10 produces a homogeneous mixture before the mixture enters the reactant chamber 50 without using a static mixer or other device that produces local, low velocity regions that can stabilize a flame. An additional advantage of the oxidizer 10 is that the oxidizer 10 produces no harmful emissions, such as NOx or CO.

Figure 2:
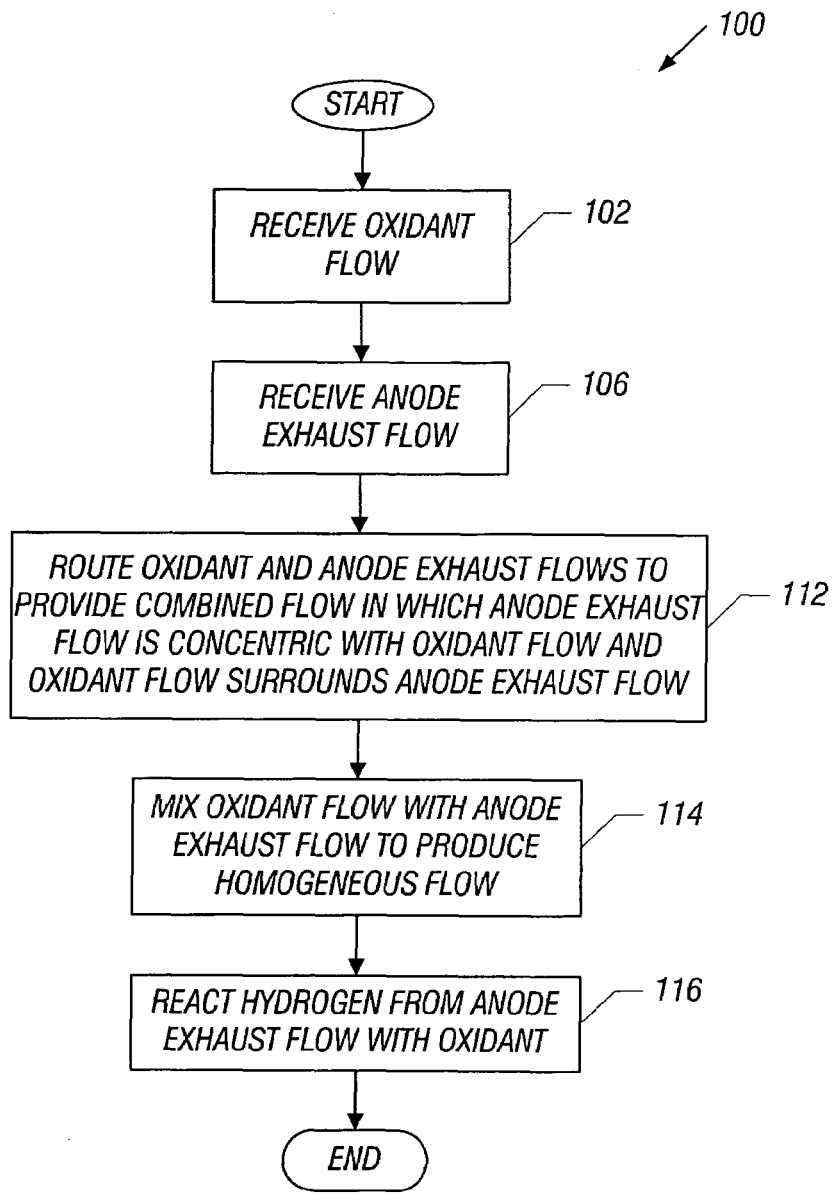
FIG. 2 is a flow diagram depicting a technique to react hydrogen present in an anode exhaust flow with an oxidant according to an embodiment of the invention.

Referring to FIG. 2, therefore, a technique 100 to oxidize hydrogen that is present in an anode exhaust flow in accordance with the invention includes receiving (block 102) an oxidant flow and receiving (block 106) an anode exhaust flow. The oxidant and anode exhaust flows are routed to produce a combined flow in which the anode exhaust flow is concentric with the oxidant flow and the oxidant flow surrounds the anode exhaust flow, as depicted in block 112. The oxidant flow is then uniformly mixed with the anode exhaust flow to produce a homogeneous flow, as depicted in block 114. Lastly, the hydrogen from the anode exhaust flow is reacted with the oxidant, as depicted in block 116.

Figure 3:
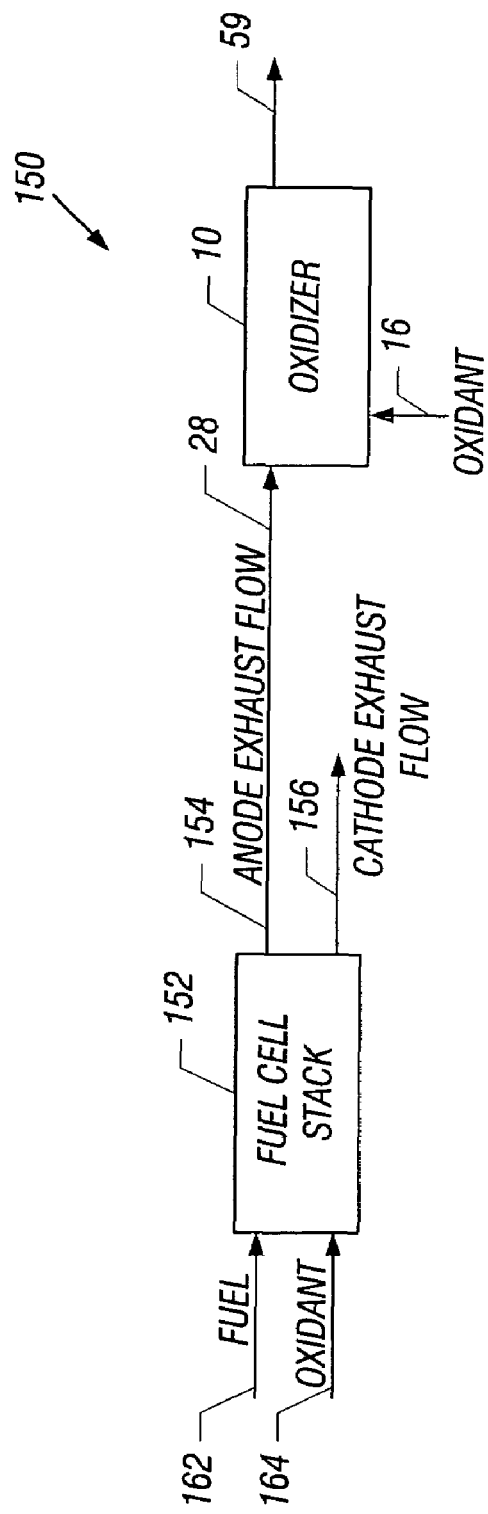
FIG. 3 is a block diagram of a fuel cell system according to an embodiment of the invention.

Referring to FIG. 3, in some embodiments of the invention, the oxidizer 10 may be used in a fuel cell system 150. As shown in FIG. 3, in some embodiments of the invention, the inlet opening 28 of the injection tube 26 (see also FIG. 1) receives an anode exhaust flow from an anode exhaust port 154 of a fuel cell stack 152. The fuel cell stack 152 may also include, for example, a cathode exhaust flow port 156 that serves as an exhaust for the cathode chamber of the fuel cell stack 152. In some embodiments of the invention, the cathode exhaust flow may be routed to the inlet 16 of the oxidant inlet of the oxidizer 10. However, in other embodiments of the invention, another source may provide oxidant to the oxidizer 10. The fuel cell stack 152 receives fuel and oxidant flows into respective anode 162 and oxidant 164 inlet ports of the fuel cell stack 152. Electrochemical reactions then occur inside the fuel cell stack 152 that produce the corresponding anode and cathode exhaust flows.

The description and depiction of the fuel cell system 150 are simplified herein for purposes of clarifying the relationship between the fuel cell stack 152 and the oxidizer 10. However, it is understood that the fuel cell system 150 may include various other components and subsystems that are not depicted in FIG. 3. For example, in the various embodiments of the invention, the fuel cell system 150 may include a coolant subsystem to circulate coolant to remove thermal energy from the fuel cell stack 152; a power conditioning subsystem to convert the electricity produced by the fuel cell stack 152 into the appropriate form for a load; a control subsystem for purposes of controlling operation of the fuel cell stack 152 and various components of the fuel cell system 150; voltage monitoring circuitry for purposes of monitoring the health and operation of cells of the fuel cell stack 152; etc.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed:

1. An oxidizer usable with a fuel cell, comprising:
   a catalyst;
   an inlet to communicate an oxidant flow;
   an injection tube coaxial with a longitudinal axis and located in the inlet to communicate an anode exhaust flow from the fuel cell into the oxidizer such that the anode exhaust flow exits the injection tube at an outlet of the injection tube, wherein the oxidant flow comprises an annular flow that is substantially parallel to the longitudinal axis both upstream of the outlet and downstream of the outlet to produce a combined flow in which the anode exhaust flow is oriented in substantially the same direction as the oxidant flow and surrounded by the oxidant flow;
   a mixing tube connected to the inlet to receive the combined flow and mix the oxidant flow and the anode exhaust flow mix together to produce a mixed flow, a cross-sectional flow area of the mixing tube being sized to prevent flashback; and
   a divergent nozzle to communicate the mixed flow to the catalyst.

2. The oxidizer of claim 1, wherein the mixing tube has a diameter sized to impart a velocity to the mixed flow to prevent flashback.

3. The oxidizer of claim 1, further comprising:
   a venturi restriction located near an inlet of the mixing tube.

4. The oxidizer of claim 3, wherein the venturi restriction increases a velocity of the combined flow to prevent flashback.

5. The oxidizer of claim 1, wherein a combined length of the divergent nozzle and the mixing tube is of a length to ensure complete mixing of the anode exhaust flow and the oxidant flow.

6. The oxidizer of claim 1, wherein the divergent nozzle receives and decelerates the mixed flow from the mixer.

7. The oxidizer of claim 1, further comprising:
   a reaction chamber connected to the divergent nozzle to hold the catalyst.

8. The oxidizer of claim 1, wherein the catalyst reacts the anode exhaust flow with the oxidant flow.

9. The oxidizer of claim 1, further comprising:
   a heating element to add thermal energy to the mixed flow.

10. A fuel cell system comprising:

a fuel cell stack provide an anode exhaust flow; and an oxidizer comprising:

a catalyst;

an inlet to communicate an oxidant flow;

an injection tube coaxial with a longitudinal axis and located in the inlet to communicate an anode exhaust flow from the fuel cell into the oxidizer such that the anode exhaust flow exits the injection tube at an outlet of the injection tube, wherein the oxidant flow comprises an annular flow that is substantially parallel to the longitudinal axis both upstream of the outlet and downstream of the outlet to produce a combined flow in which the anode exhaust flow is oriented in substantially the same direction as the oxidant flow and surrounded by the oxidant flow;

a mixing tube connected to the inlet to receive the combined flow and mix the oxidant flow and the anode exhaust flow mix together to produce a mixed flow, a cross-sectional area of the mixing tube being sized to prevent flashback; and a divergent nozzle to communicate the mixed flow to the catalyst.

11. The fuel cell system of claim 10, wherein the mixing tube has a diameter sized to impart a velocity to the mixed flow to prevent flashback.

12. The fuel cell system of claim 10, further comprising:

a venturi restriction located near an inlet of the mixing tube.

13. The fuel cell system of claim 12, wherein the venturi restriction increases a velocity of the combined flow to prevent flashback.

14. The fuel cell system of claim 10, wherein a combined length of the divergent nozzle and the mixing tube is of a length to ensure complete mixing of the anode exhaust flow and the oxidant flow.

15. A method usable with a fuel cell, comprising:

receiving a first flow having a gas capable of causing an electrochemical reaction inside a fuel cell;

receiving an oxidant flow;

introducing the first flow into an oxidizer such that the anode exhaust flow exits the injection tube at an outlet of an injection tube;

introducing the oxidant flow into the oxidizer so that the oxidant flow is substantially parallel to a longitudinal axis of the injection tube both upstream and downstream of the outlet of the injection tube to produce a combined flow in which the anode exhaust flow is oriented in substantially the same direction as the oxidant flow and surrounded by the oxidant flow;

routing the first flow and the oxidant flow into a mixing tube and a divergent nozzle to mix the first flow and the oxidant flow before the resultant mixed flow reaches a catalyst; and sizing a cross-sectional flow area of the mixing tube to prevent flashback.

16. The method of claim 15, wherein the sizing comprises:

sizing a diameter of the mixing tube to impart a velocity to the mixed flow to prevent flashback.

17. The method of claim 15, further comprising:

placing a venturi restriction near an inlet of the mixing tube.

18. The method of claim 15, further comprising:

forming the divergent nozzle and mixing tube of a length to ensure complete mixing of the anode exhaust flow and the oxidant flow.

19. The method of claim 15, further comprising:

preheating the mixed flow.

* * * * *